UNITED STATES PATENT OFFICE.

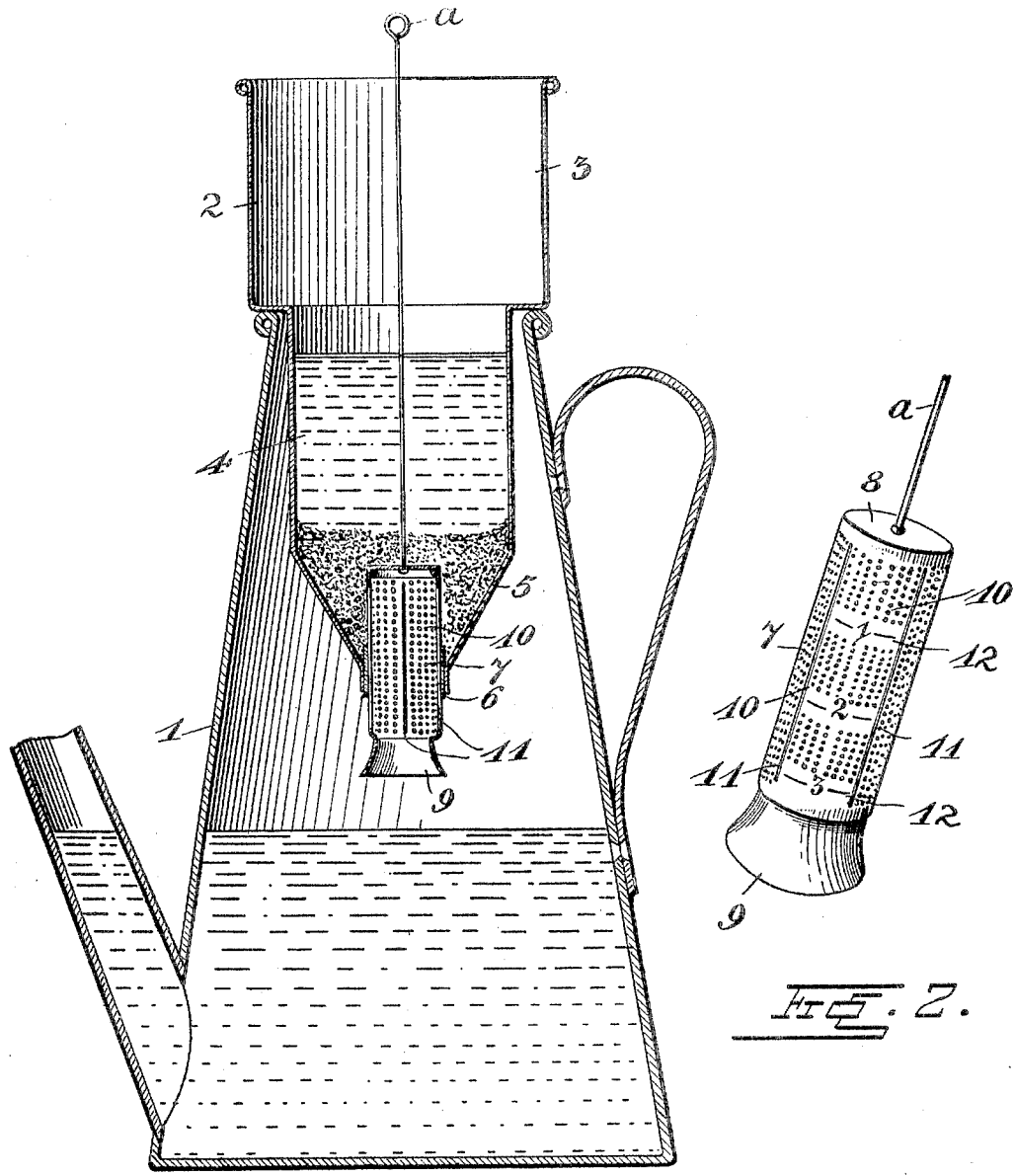

HOWARD W. WELLES, OF POUGHKEEPSIE, NEW YORK.

ADJUSTABLE COFFEE-FILTER.

No. 797,478.          Specification of Letters Patent.          Patented Aug. 15, 1905.

Application filed December 20, 1904. Serial No. 237,665.

*To all whom it may concern:*

Be it known that I, HOWARD W. WELLES, a citizen of the United States, residing at Poughkeepsie, in the county of Dutchess and State of New York, have invented new and useful Improvements in Adjustable Coffee-Filters, of which the following is a specification.

This invention relates to coffee-filters of that particular class designed for the purpose of making so-called "French drip-coffee;" and the principal object of the invention is to provide means for adjusting the filter to expose more or less of the perforated surface thereof, depending upon the coarseness or fineness of the coffee used.

Ground coffee as it comes from the grocer varies to a considerable extent as to its coarseness, owing doubtless to the fact that the coffee-mill at the grocery is set usually to suit different customers, and unless great care is taken by a purchaser coffee will be delivered at different times in varying degrees of fineness. Where coarse coffee is placed in a filter, in order to produce the best results the filter should be adjusted to expose a comparatively small filtering-surface, because the hot water is more liable to pass quickly through coarse coffee than fine, and hence should be retarded in order to produce good results. Where the coffee is fine, a larger filtering-surface provided with perforations should be used, because the coffee packs closely within the container and serves to retard the dripping process.

In carrying out my invention I have taken advantage of the facts above referred to and have provided a filter capable of adjustment to a degree commensurate with the character or coarseness of the coffee to be made.

In the accompanying drawings, Figure 1 is a central vertical section taken through an ordinary coffee-pot having my improved filter therein, and Fig. 2 is a perspective view of my strainer detached from the dripper.

Referring to the drawings for a more particular description of the invention, the numeral 1 denotes a coffee pot or container of the usual or any preferred construction, and 2 is a dripper comprising an enlarged upper portion 3, a reduced lower portion 4, and a tapering or funnel-shaped lower end 5, in the lower end of which a sleeve or bearing 6 is secured to provide a smooth and accurate fitting for my filter. The filter consists of a hollow cylindrical tube 7, closed at its upper end, as at 8, and provided with a flaring lower end 9. A series of perforations 10 are formed in the filter-walls, and at suitable intervals between rows of perforations longitudinal slits or slots 11 are formed, which extend substantially from end to end of the filter, thus rendering its walls resilient to fit closely within the bearing-ring or fitting. At one side of the filter graduating-marks 12 are provided, said marks comprising the ordinals "1," "2," and "3," arranged upon imperforate portions intermediate the perforated wall of the filter.

From the foregoing it will be obvious that should fine coffee be used the filter should be adjusted upward within the dripper to the numeral "3," thus exposing a large area of dripping-surface within said dripper, owing to the fact that the fine coffee will pack closely around the filter and will retard the dripping process. Should coarse coffee be used, a dripping or filter surface of less area may be used to advantage, because the hot water is liable to pass quickly through coarse granulations. Hence the filter should be adjusted to either the scale "1" or "2," depending somewhat upon the quantity of coffee to be used. Should it be necessary to make a large quantity of coffee, the body of the coffee in the dripper would serve to retard the dripping process, and hence a larger dripping-surface could be used to advantage.

For convenience in adjusting the filter I have provided a suitable wire handle *a*, secured at the upper end of the filter and extending up through the dripper. This handle may be used when it is found that the coffee is dripping either too fast or too slow.

Various changes in the form, proportion, and the minor details of construction may be resorted to without departing from the principle or sacrificing any of the advantages of this invention.

Having thus described my invention, what I claim as new, and desire to secure by Letters Patent, is—

1. A coffee-filter comprising a hollow tube or shell having a closed upper end, a flaring lower end, said shell provided with perforations and intermediate slots or slits to render the same resilient, and indicating-marks at intervals, substantially as described.

2. A coffee-filter comprising a hollow tube or shell having a closed upper end, said shell being provided with perforations and intermediate slots or slits to render the same resilient and indicating-marks at intervals intermediate the slots, substantially as described.

In testimony whereof I have signed my name to this specification in the presence of two subscribing witnesses.

HOWARD W. WELLES.

Witnesses:
 EDUARD QUINTARD,
 W. M. QUINTARD.